(12) United States Patent
Galera et al.

(10) Patent No.: US 9,921,300 B2
(45) Date of Patent: Mar. 20, 2018

(54) WAVEFORM RECONSTRUCTION IN A TIME-OF-FLIGHT SENSOR

(71) Applicants: Rockwell Automation Technologies, Inc., Mayfield Heights, OH (US); Innovaciones Microelectrónicas S.L., Seville (ES)

(72) Inventors: Richard Galera, Nashua, NH (US); Anne Bowlby, Milwaukee, WI (US); Derek W. Jones, Galloway (GB); Nilesh Pradhan, Milwaukee, WI (US); Francis L. Leard, Sudbury, MA (US); Rafael Dominguez Castro, Benacazón (ES); Sergio Morillas Castillo, Seville (ES); Rafael Romay Juárez, Seville (ES)

(73) Assignees: Rockwell Automation Technologies, Inc., Mayfield Heights, OH (US); Innovaciones Microelectrónicas S.L., Sevilla (ES)

( * ) Notice: Subject to any disclaimer, the term of this patent is extended or adjusted under 35 U.S.C. 154(b) by 512 days.

(21) Appl. No.: 14/609,340

(22) Filed: Jan. 29, 2015

(65) Prior Publication Data

US 2015/0331092 A1    Nov. 19, 2015

Related U.S. Application Data

(60) Provisional application No. 62/000,486, filed on May 19, 2014.

(51) Int. Cl.
*G01C 3/08*    (2006.01)
*G01S 7/486*    (2006.01)
(Continued)

(52) U.S. Cl.
CPC .......... *G01S 7/4863* (2013.01); *G01S 7/4865* (2013.01); *G01S 17/10* (2013.01); *G01S 17/89* (2013.01)

(58) Field of Classification Search
CPC ...... G01S 7/4863; G01S 7/4865; G01S 17/10; G01S 17/89
See application file for complete search history.

(56) References Cited

U.S. PATENT DOCUMENTS

| 4,967,317 A | 10/1990 | Plumly |
| 5,029,008 A | 7/1991 | Ferren |

(Continued)

FOREIGN PATENT DOCUMENTS

| CN | 1437063 | 8/2003 |
| CN | 101114021 | 1/2008 |

(Continued)

OTHER PUBLICATIONS

Office Action for U.S. Appl. No. 14/553,363, dated Nov. 4, 2016, 33 pages.

(Continued)

*Primary Examiner* — Samantha K Abraham
(74) *Attorney, Agent, or Firm* — Amin, Turocy & Watson, LLP

(57) ABSTRACT

A time-of-flight (TOF) sensor device is provided that is capable of accurately recovering waveforms of reflected light pulses incident on the sensor's photo-receiver array using a low sampling rate. A number of samples for a received light pulse incident on a given photo-receiver are obtained by emitting a light pulse to the viewing field, integrating the electrical output generated by the photo receiver over an integration period, and adding the integral values for respective integration cycles to yield an accumulation value. This process is repeated for multiple accumu- (Continued)

lation cycles; however, for each consecutive accumulation cycle the start of the integration period is delayed relative the start time of the integration period for the previous cycle by a delay period. Sampled values for the waveform are obtained by determining the difference values between consecutive accumulation values for the respective accumulation cycles.

20 Claims, 14 Drawing Sheets

(51) Int. Cl.
    *G01S 17/10*    (2006.01)
    *G01S 17/89*    (2006.01)

(56) References Cited

U.S. PATENT DOCUMENTS

| | | | |
|---|---|---|---|
| 5,075,823 | A | 12/1991 | Chomyn |
| 6,235,148 | B1 | 5/2001 | Courson et al. |
| 6,517,213 | B1 | 2/2003 | Fujita et al. |
| 7,255,691 | B2 | 8/2007 | Tolkoff et al. |
| 7,355,179 | B1 | 4/2008 | Wood et al. |
| 7,796,820 | B2 | 9/2010 | Simon et al. |
| 8,224,032 | B2 | 7/2012 | Fuchs et al. |
| 8,253,792 | B2 | 8/2012 | Wells et al. |
| 8,421,037 | B2 | 4/2013 | Leard |
| 8,480,246 | B2 | 7/2013 | Leard |
| 8,531,308 | B2 | 9/2013 | Dickie et al. |
| 9,251,598 | B2 | 2/2016 | Wells et al. |
| 2002/0061134 | A1 | 5/2002 | Cofer et al. |
| 2002/0186299 | A1 | 12/2002 | Cofer |
| 2004/0041984 | A1 | 3/2004 | Tani et al. |
| 2004/0095996 | A1 | 5/2004 | Mossakowski |
| 2004/0150991 | A1 | 8/2004 | Ouderkirk et al. |
| 2004/0150997 | A1 | 8/2004 | Ouderkirk et al. |
| 2004/0233416 | A1 | 11/2004 | Doemens et al. |
| 2005/0207618 | A1 | 9/2005 | Wohler et al. |
| 2006/0227317 | A1 | 10/2006 | Henderson et al. |
| 2007/0217670 | A1 | 9/2007 | Bar-Am |
| 2008/0007709 | A1 | 1/2008 | Bamji et al. |
| 2008/0013821 | A1 | 1/2008 | Macgregor et al. |
| 2008/0144000 | A1 | 6/2008 | Thun et al. |
| 2008/0302951 | A1 | 12/2008 | Aoki et al. |
| 2009/0079841 | A1 | 3/2009 | Leard et al. |
| 2009/0129115 | A1 | 5/2009 | Fine et al. |
| 2009/0245651 | A1 | 10/2009 | Friedhoff et al. |
| 2009/0257241 | A1 | 10/2009 | Meinke et al. |
| 2010/0128109 | A1 | 5/2010 | Banks |
| 2010/0136302 | A1 | 6/2010 | Comanzo et al. |
| 2010/0207762 | A1 | 8/2010 | Lee et al. |
| 2011/0050878 | A1 | 3/2011 | Wells et al. |
| 2011/0051119 | A1 | 3/2011 | Min et al. |
| 2011/0109617 | A1 | 5/2011 | Snook et al. |
| 2012/0106791 | A1 | 5/2012 | Lim |
| 2012/0146789 | A1 | 6/2012 | De Luca et al. |
| 2012/0146792 | A1 | 6/2012 | De Luca et al. |
| 2012/0293625 | A1 | 11/2012 | Schneider et al. |
| 2012/0294536 | A1 | 11/2012 | Neuman et al. |
| 2012/0330447 | A1 | 12/2012 | Gerlach et al. |
| 2013/0038882 | A1 | 2/2013 | Umeda et al. |
| 2013/0044310 | A1 | 2/2013 | Mimeault |
| 2013/0094705 | A1 | 4/2013 | Tyagi et al. |
| 2013/0155723 | A1 | 6/2013 | Coleman |
| 2013/0182114 | A1 | 7/2013 | Zhang et al. |
| 2013/0194776 | A1 | 8/2013 | Santos et al. |
| 2013/0300835 | A1 | 11/2013 | Kinoshita et al. |
| 2014/0055771 | A1 | 2/2014 | Oggier |
| 2014/0294245 | A1 | 10/2014 | Siilats |
| 2015/0043787 | A1 | 2/2015 | Fredrich et al. |

FOREIGN PATENT DOCUMENTS

| | | |
|---|---|---|
| CN | 102447882 | 5/2012 |
| CN | 103181156 | 6/2013 |
| DE | 102006048166 | 2/2008 |
| DE | 102012021375 | 5/2013 |
| EP | 0835460 | 4/1998 |
| EP | 2642429 | 9/2013 |
| GB | 2319426 | 5/1998 |
| KR | 20130008469 | 1/2013 |
| WO | 2008152647 | 12/2008 |
| WO | 2013135608 | 9/2013 |

OTHER PUBLICATIONS

Notice of Allowance for U.S. Appl. No. 14/509,466, dated Dec. 13, 2016, 34 pages.
Chinese Office Action and English Translation for CN Patent Application Serial No. 201510256225.8, dated Aug. 19, 2016, 19 pages.
Office Action for U.S. Appl. No. 14/525,125, dated Oct. 21, 2016, 76 pages.
Notice of Allowance for U.S. Appl. No. 14/943,246, dated Jun. 29, 2016, 42 pages.
Office Action dated Jul. 29, 2016 for U.S. Appl. No. 14/509,466, 21 pages.
Extended European Search Report for EP Application Serial No. 15168241.6, dated Mar. 7, 2016, 8 pages.
Extended European Search Report for EP Application Serial No. 15168237.4, dated Dec. 21, 2015, 2 pages.
Extended European Search Report for EP Application Serial No. 15168239.0, dated Nov. 30, 2015, 2 pages.
Extended European Search Report for EP Application Serial No. 15168119.4, dated Nov. 30, 2015, 2 pages.
Final Office Action for U.S. Appl. No. 14/509,466 dated Apr. 8, 2016, 20 pages.
Extended European Search Report for EP Application Serial No. 15168237.4, dated Nov. 12, 2015, 8 pages.
Office Action dated Dec. 17, 2015 for U.S. Appl. No. 14/509,466, 25 pages.
Notice of Allowance for U.S. Appl. No. 14/553,431, dated Oct. 8, 2015, 25 pages.
Extended European Search Report for EP Application Serial No. 15168239.0, dated Oct. 5, 2015, 10 pages.
Extended European Search Report for EP Application Serial No. 15168119.4, dated Oct. 26, 2015, 9 pages.
Office Action for U.S. Appl. No. 14/525,125, dated Feb. 16, 2017, 105 pages.
Notice of Allowance for U.S. Appl. No. 14/553,363, dated Feb. 28, 2017, 20 pages.
European office Action for Application Serial No. 15/168,119.4 dated Apr. 26, 2017, 9 pages.
Dickens et al., "Pedestrian Detection for Underground Mine Vehicles Using Thermal Images", AFRICON, 2011, IEEE, Sep. 13, 2011 (Sep. 13, 2011), pp. 1-6, XP031990097, DOI: 10.1109/AFRCON.2011.6072167, ISBN: 978-1-61284-992-8.
Chinese Office Action for Application Serial No. 201510256019.7, dated Feb. 27, 2017.
Non-Final Office Action for U.S. Appl. No. 14/525,125 dated Jun. 30, 2017, 63 pages.
Final Office Action for U.S. Appl. No. 14/525,125 dated Dec. 21, 2017, 62 pages.

WAVEFORM RECONSTRUCTION IN A TIME-OF-FLIGHT SENSOR

CROSS-REFERENCE TO RELATED APPLICATIONS

This application claims priority to U.S. Provisional Application Ser. No. 62/000,486, filed on May 19, 2014, entitled "WAVEFORM RECONSTRUCTION IN A TIME-OF-FLIGHT SENSOR," the entirety of which is incorporated herein by reference.

BACKGROUND

The subject matter disclosed herein relates generally to time-of-flight (TOF) sensors, more particularly, to a TOF sensor capable of accurately reconstructing a waveform for a reflected light pulse using a relatively low sampling rate for the purpose of object distance measurement and additional waveform analysis

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a time-of-flight (TOF) sensor device is provided comprising an illumination component configured to emit a periodic light pulse toward a viewing field; a photo-receiver configured to generate an electrical output proportional to an intensity of light incident on a surface of the photo-receiver; a pixel array component configured to group photo-receivers reconstructing the viewing field (the illuminated scene); and a waveform reconstruction component configured to generate sampled values of a waveform corresponding to a reflected light pulse received by the photo-receiver, wherein the waveform reconstruction component generates a sampled value, of the sampled values, based on a difference between a first accumulated value obtained during a first accumulation cycle and a second accumulated value obtained during a second accumulation cycle, wherein the first accumulated value comprises a first sum of N integrated values of the electrical output integrated over respective N first integration periods during the first accumulation cycle, where N is an integer, the second accumulated value comprises a second sum of N integrated values of the electrical output integrated over respective N second integration periods during the second accumulation cycle, and a start time of the second integration periods within the second accumulation cycle is delayed by a delay period (the sampling rate) relative to a start time of the first integration periods within the first accumulation cycle.

Also, one or more embodiments provide a method for reconstituting a waveform for a TOF light pulse, comprising for respective N first integration cycles a first accumulation cycle: initiating, by a TOF sensor device comprising at least one processor, a first integration period for a first integration cycle; emitting, by the TOF sensor device, a first light pulse during the first integration cycle; integrating an instantaneous electrical output generated by the photo-receiver over a duration of the first integration period to yield a first integral value; and adding the first integral value to other integral values obtained for remaining (N−1) first integration cycles of the N first integration cycles to yield s first accumulation value; and for respective N second integration cycles of a second accumulation cycle: initiating a second integration period for a second integration cycle, wherein the initiating comprises delaying a start time of second integration period within the second integration cycle by a delay period (the sampling rate) relative to a start time of the first integration period within the first integration cycle; emitting, by the TOF sensor device, a light pulse during the second integration cycle; integrating an instantaneous electrical output generated by the photo-receiver over a duration of the second integration period to yield a second integral value; and adding the second integral value to integral values obtained for remaining (N−1) second integration cycles of the N second integration cycles to yield a second accumulation value; and determining a difference between the first accumulated value and the second accumulated value to yield a sampled value to reconstitute a waveform corresponding to a reflected light pulse received at the photo-receiver.

Also, according to one or more embodiments, a non-transitory computer-readable medium is provided having stored thereon instructions that, in response to execution, cause a TOF sensor device to perform operations, the operations comprising, emitting a periodic light pulse; for an accumulation cycle of a plurality of accumulation cycles: initiating an integration period for the accumulation cycle, wherein a start time of the integration period within the accumulation cycle is delayed by a delay period (the sampling rate) relative to a start time of the integration period for a previous accumulation cycle of the plurality of accumulation cycles; and integrating, for N iterations, an instantaneous electrical output generated by the photo-receiver over a duration of the integration period to yield N integral values; summing the N integral values to yield an accumulated value; repeating the initiating, the emitting, the integrating, and the summing for the plurality of accumulation cycles to yield a respective plurality of accumulated values; and determining difference values between consecutive accumulated values of the accumulated values to yield a set of sampled values for a waveform corresponding to the reflected light pulses from the viewing field.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1B:
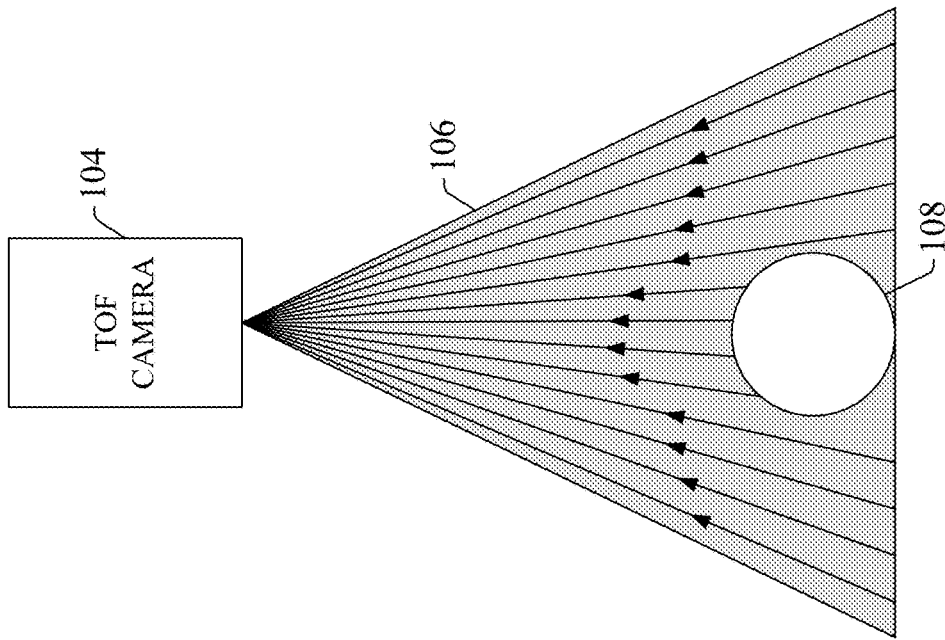
FIGS. 1A and 1B are schematic illustrating general operation of a time-of-flight (TOF) camera.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Figure 1A:
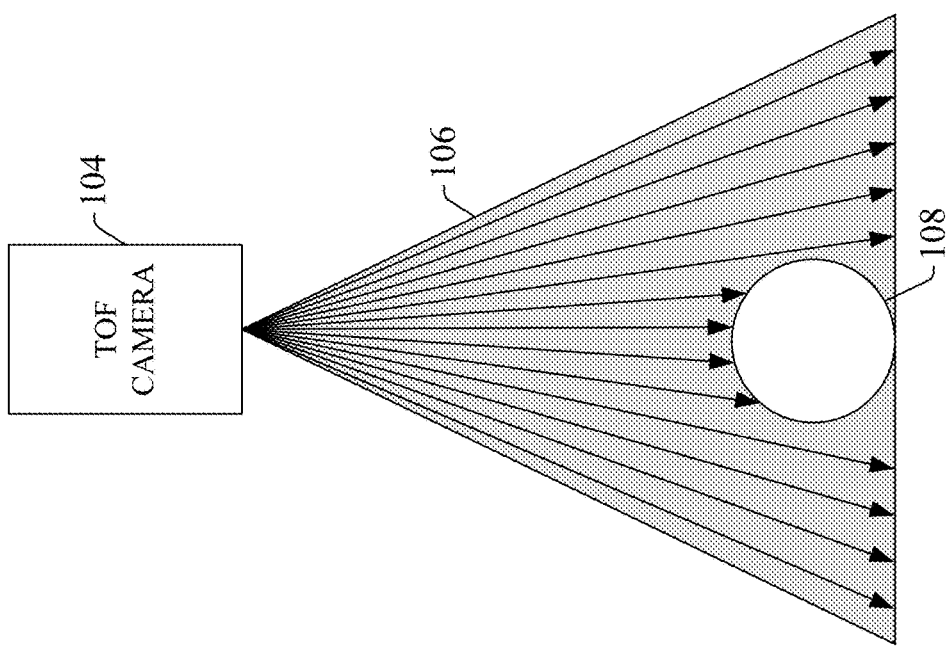

Time-of flight (TOF) cameras use optical techniques to generate distance information for objects and surfaces within the camera's viewing field. FIGS. 1A and 1B illustrate an example TOF camera 104 measuring distance information for an object 108. TOF camera 104 illuminates a viewing field or scene by emitting a beam 106 of light pulses, as shown in FIG. 1A. Objects and surfaces within the scene, including object 108, reflect light pulses back to the receiving element of TOF camera 104, as shown in FIG. 1B. The TOF camera 104 then analyzes the reflected light pulses by measuring the time difference between transmission of a light pulse and receipt of a reflected light pulse for each pixel of the scene. Since light speed is a constant in a given medium, the time delay between transmission of a light pulse and arrival of a corresponding reflected pulse for a given pixel is a function of the distance of a surface point corresponding to that pixel, the distance of an object at an area of the scene corresponding to the pixel can be determined. Collectively, the distance information obtained for all pixels of the scene yields depth map data for the scene.

The reflected light pulses are collected on an array of sensors or photo-receivers within the camera to obtain spatial information. A variety of photo-receivers are available for use, varying based on geometry, types of material used, construction, sensitivity profile, and other parameters. When reflected light pulses are incident on the photo-receivers, the incident light is converted into an electrical output proportional to the intensity of the incident light. The camera then recovers and analyzes the electrical output. To ensure accurate distance measurement using light pulse time delay estimation, a near perfect recovery and representation of the reflected light pulse is vital. In some TOF cameras, the electrical output generated by a photo-receiver is converted into a train of digital samples, and the resulting signal train is analyzed in the digital domain. For accurate distance measurement, a high sampling frequency is required to convert the electrical output from the photo-receiver into digital values. For periodic signals—such as those obtained from reflected illumination pulses—a lower sampling rate could be used. Waveform recovery methods that introduce time delays for sampling and interleaving samples to reconstruct the waveform can be employed; however, these methods require photo-receivers that support a relatively high bandwidth. Moreover, many available technologies (e.g., photo-receivers, readout circuits for CMOS photo diodes, analog-to-digital converters, etc.) are not conducive to high-speed sampling.

To address these and other issues, one or more embodiments of the present disclosure provide a TOF sensor capable of attaining accurate distance measurement using a relatively low sampling rate. To this end, components of the TOF sensor obtain a number of samples for a received light pulse incident on a given photo-receiver by emitting a train of light pulses to the viewing field and integrating the electrical output generated by the photo receiver over each integration period and summing those values to yield an accumulation value. The sensor repeats this process for multiple accumulation cycles; however, for each consecutive accumulation cycle the start of the integration period is delayed relative to the start time of the integration period for the previous cycle by a delay period (the sampling rate). The delay period may be a function of the desired number of samples, and/or the distance of an object being measured by the TOF sensor. Sampled values for the waveform are obtained by determining the difference values between consecutive accumulation values for the respective accumulation cycles.

Figure 2:
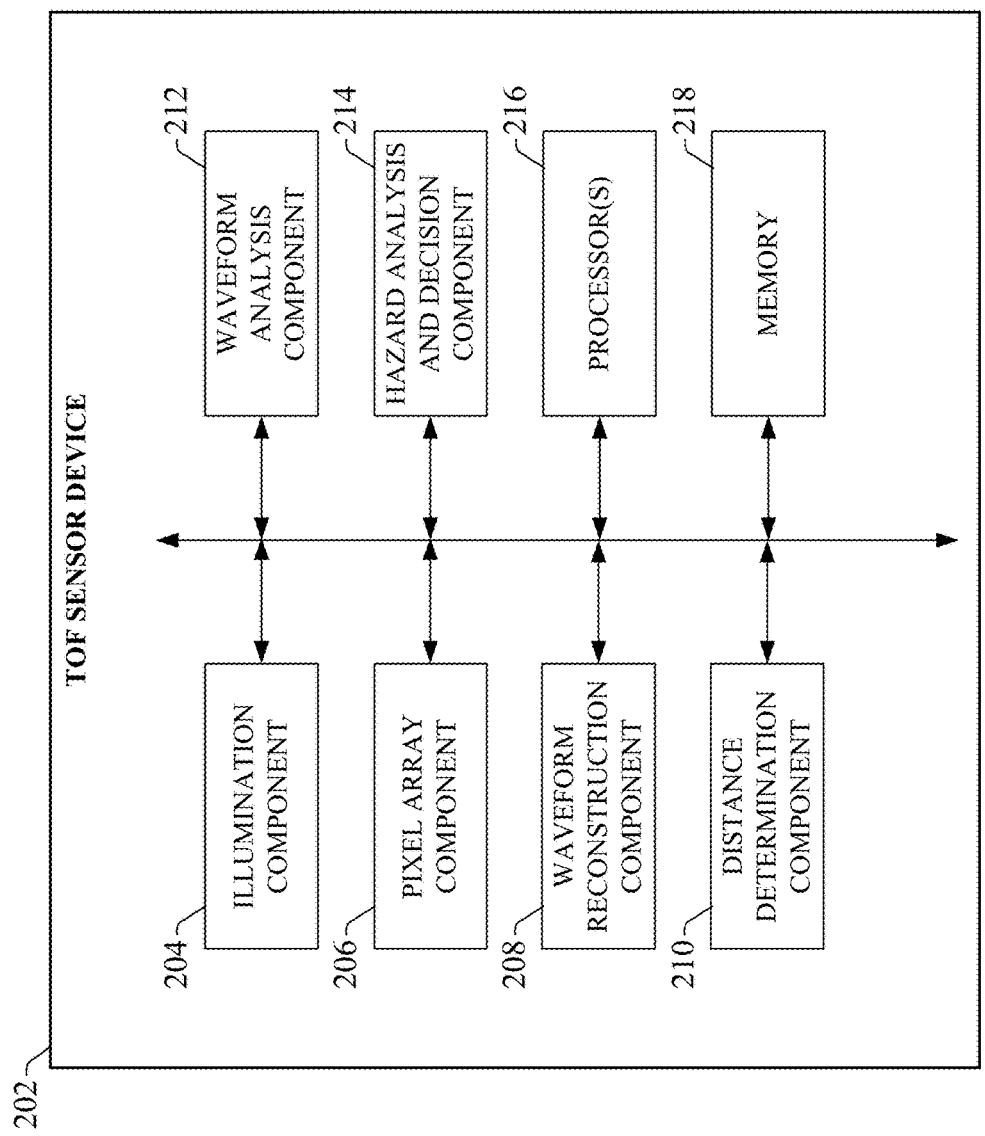
FIG. 2 is a block diagram of an example TOF sensor device.

FIG. 2 is a block diagram of an example TOF sensor device 202 according to one or more embodiments of this disclosure. Although FIG. 2 depicts certain functional components as residing on TOF sensor device 202, it is to be appreciated that one or more of the functional components illustrated in FIG. 2 may reside on a separate device relative to TOF sensor device 202 in some embodiments. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

TOF sensor device 202 can include an illumination component 204, a pixel array component 206, a waveform reconstruction component 208, a distance determination component 210, a waveform analysis component 212, a hazard analysis and decision component 214, one or more processors 216, and memory 218. In various embodiments, one or more of the illumination component 204, pixel array component 206, waveform reconstruction component 208, distance determination component 210, waveform analysis component 212, hazard analysis and decision component 214, the one or more processors 216, and memory 218 can be electrically and/or communicatively coupled to one another to perform one or more of the functions of the TOF sensor device 202. In some embodiments, components 204, 206, 208, 210, 212, and 214 can comprise software instructions stored on memory 218 and executed by processor(s) 216. TOF sensor device 202 may also interact with other hardware and/or software components not depicted in FIG. 2. For example, processor(s) 216 may interact with one or more external user interface devices, such as a keyboard, a mouse, a display monitor, a touchscreen, another sensor, a network, a safety device, or other such interface devices.

Illumination component 204 can be configured to control emission of light by the sensor device. TOF sensor device 202 may comprise a laser, light emitting diode (LED), remote phosphor, or other type of light source under the control of illumination component 204. In particular, illumination component 204 emits periodic light pulses directed to the viewing field, so that time-of-flight information can be generated by the TOF sensor device 202 based on the reflected light pulses returned to the sensor's photo-receiver array. The pixel array component 206 can be configured to scan the pixels of the TOF sensor device's photo-receiver array and generate pixel array data based on measurement of the electrical outputs generated by the photo-receivers in response to receipt of reflected light pulses from the viewing field. The waveform reconstruction component 208 can be configured to, for each pixel of the pixel array, generate a waveform corresponding to a reflected light pulse received at the photo-receiver corresponding to that pixel. Distance determination component 210 can be configured to derive distance information for each pixel based on the waveforms constructed by the waveform reconstruction component 208, and generate a depth map for the viewing area based on the distance information.

The waveform analysis component 212 can be configured to analyze the reconstructed waveform signal to, for example, identify specific waveform patterns or filter specific pulses considered not relevant for the depth map data. The hazard analysis and decision component 214 can be configured to control one or more sensor outputs based on results generated by the distance determination component 210 and the waveform analysis component 212. This can include, for example, sending a control signal to an industrial device or controller to perform a control action, initiating a safety action (e.g., removing power from a hazardous machine, switching an industrial system to a safe operating mode, etc.), sending a feedback message to a display device (e.g., a human-machine interface, a personal mobile device, etc.), sending depth map data to an on-board computer in a mobile vehicle, or other such output.

The one or more processors 216 can perform one or more of the functions described herein with reference to the systems and/or methods disclosed. Memory 218 can be a computer-readable storage medium storing computer-executable instructions and/or information for performing the functions described herein with reference to the systems and/or methods disclosed.

Figure 3:
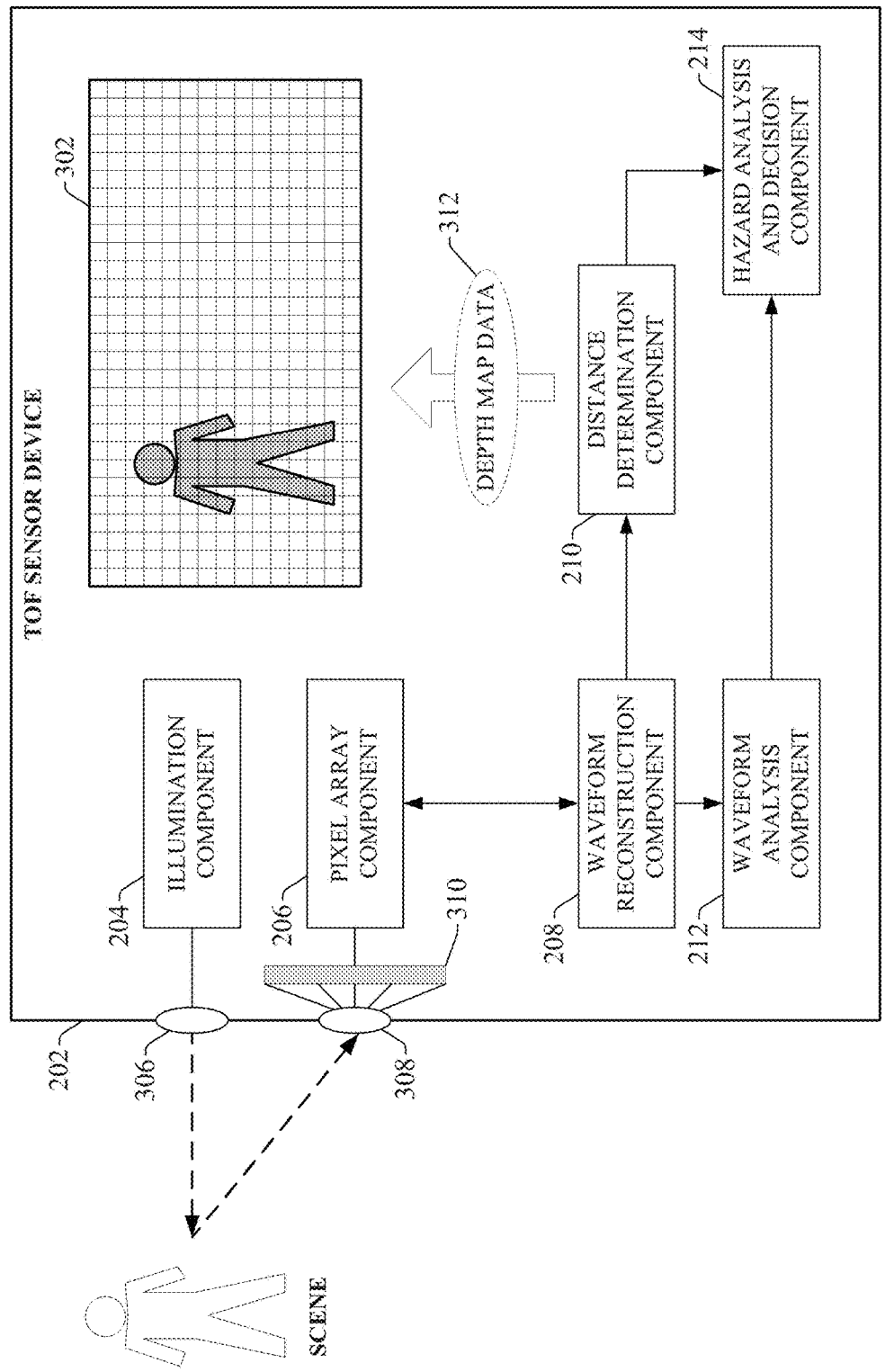
FIG. 3 is a block diagram illustrating components of the TOF sensor device.

FIG. 3 is a block diagram illustrating components of the TOF sensor device 202 according to one or more embodiments. In this example, illumination component 204 controls emission of LED, laser light, or remote phosphor pulses to the viewing field via lens element 306. For example, illumination component 204 may project a wide beam of light pulses (e.g., a cone-shaped beam) over the viewing field (e.g., a cone-shaped beam). Receiver lens element 308 receives light pulses reflected from the viewing field and directs the reflected light pulses to a photo-receiver array 310, which generates respective electrical outputs for each pixel of the array as a function of the intensity of the light pulse received at each photo-receiver. Pixel array component 206 performs a readout of the photo-receiver array 310 at regular intervals to obtain samples of the voltage output data for each pixel for analysis.

The sampled information is provided to waveform reconstruction component 208, which reconstitutes the waveforms corresponding to the reflected light pulses received at the photo-receiver array 310 using techniques described in more detail below. Based on the waveform data generated by waveform reconstruction component 208, distance determination component 210 can determine a distance value associated with each pixel, and additional analysis can be conducted by waveform analysis component 212. The distance value represents the distance of the object or surface corresponding to the pixel from the TOF sensor device, and can be determined by identifying the front edge of the returned light pulse from the waveform data, which represents the time at which the light pulse was received at the receiver lens element 308. The distance determination component 210 can then compare this time with the time at which the emitted light pulse was sent by the illumination component 204. The difference between the two times represents the time-of-flight for the pulse, from which the distance information for the pixel can be derived. By performing waveform reconstruction and distance determination for each pixel in the pixel array, the TOF sensor can generate depth map data 312, which can be used to create a 3D point cloud 302 of the viewing field. Based on the particular application being executed by the TOF sensor device 202, hazard analysis and decision component 214 can be instructed to generate a suitable control or message output based on the depth map data and additional waveform analysis.

Figure 4:
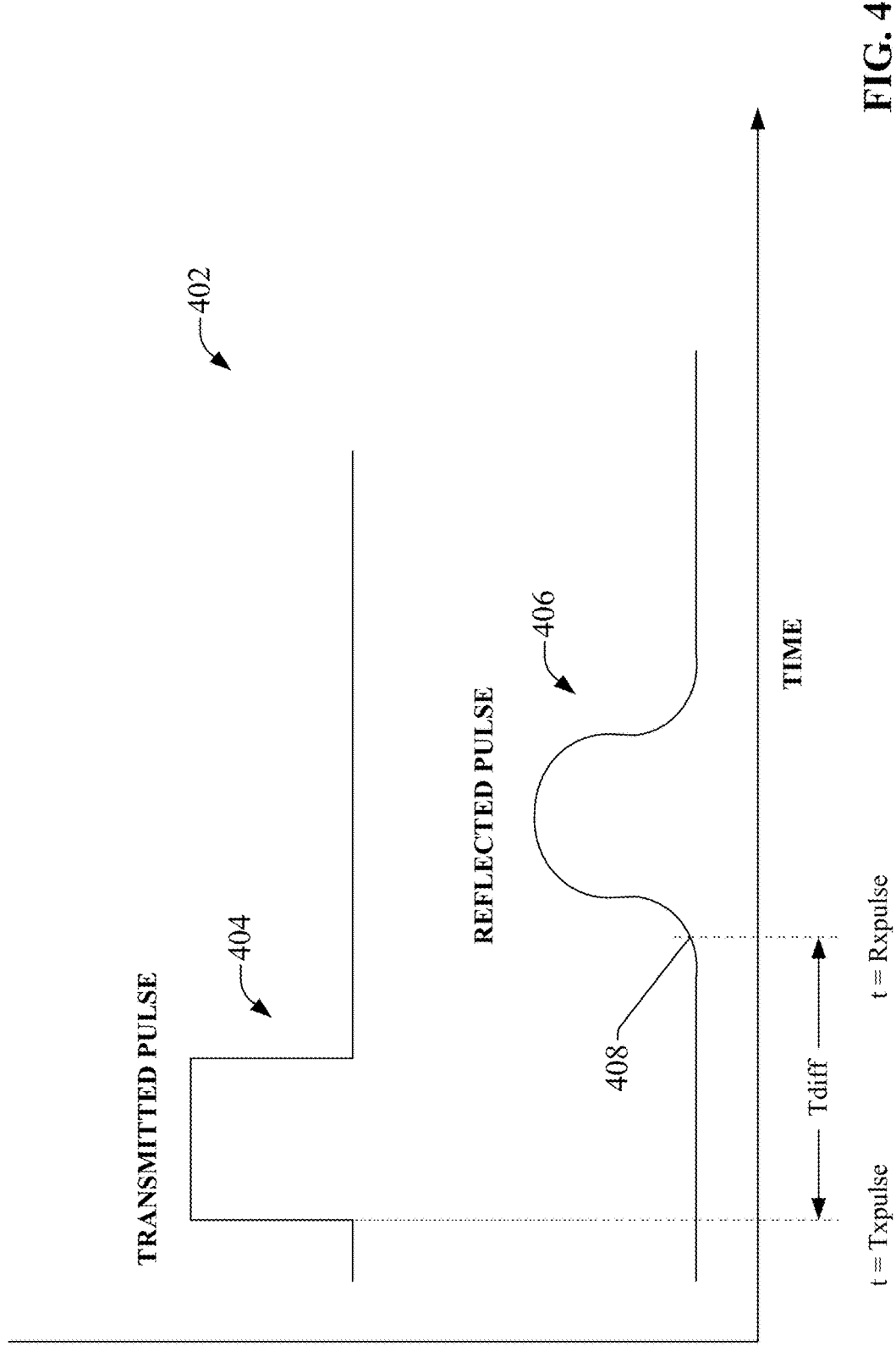
FIG. 4 is a graph that plots a representation of a transmitted light pulse sent by a TOF sensor and a corresponding reflected light pulse subsequently received at the photo-receiver of the TOF sensor.

Techniques implemented by the waveform reconstruction component 208 and distance determination component 210 for reconstructing the reflected light pulse waveforms are now described. FIG. 4 is a timing chart 402 that plots a representation of a transmitted light pulse 404 sent by the TOF sensor device's lens element 306 and a waveform for a corresponding reflected light pulse 406 subsequently received at the photo-receiver. The difference Tdiff between the time Txpulse at which light pulse 404 begins emission and time Rxpulse when the reflected light pulse 406 begins arriving at the photo-receiver is proportional to the distance (from the TOF sensor) of a surface from which the transmitted light pulse 404 was reflected. Since the transmitted light pulse 404 is generated within the TOF sensor device itself, the start and stop times for the transmitted pulse can be accurately measured by the sensor's internal components, yielding a substantially square wave having a length corresponding to the duration of the transmitted pulse. The waveform for the reflected light pulse 406 is determined by sampling the photo-receiver at which the return pulse is received, and applying curve-fitting on the sampled values to yield the waveform.

Figure 5:
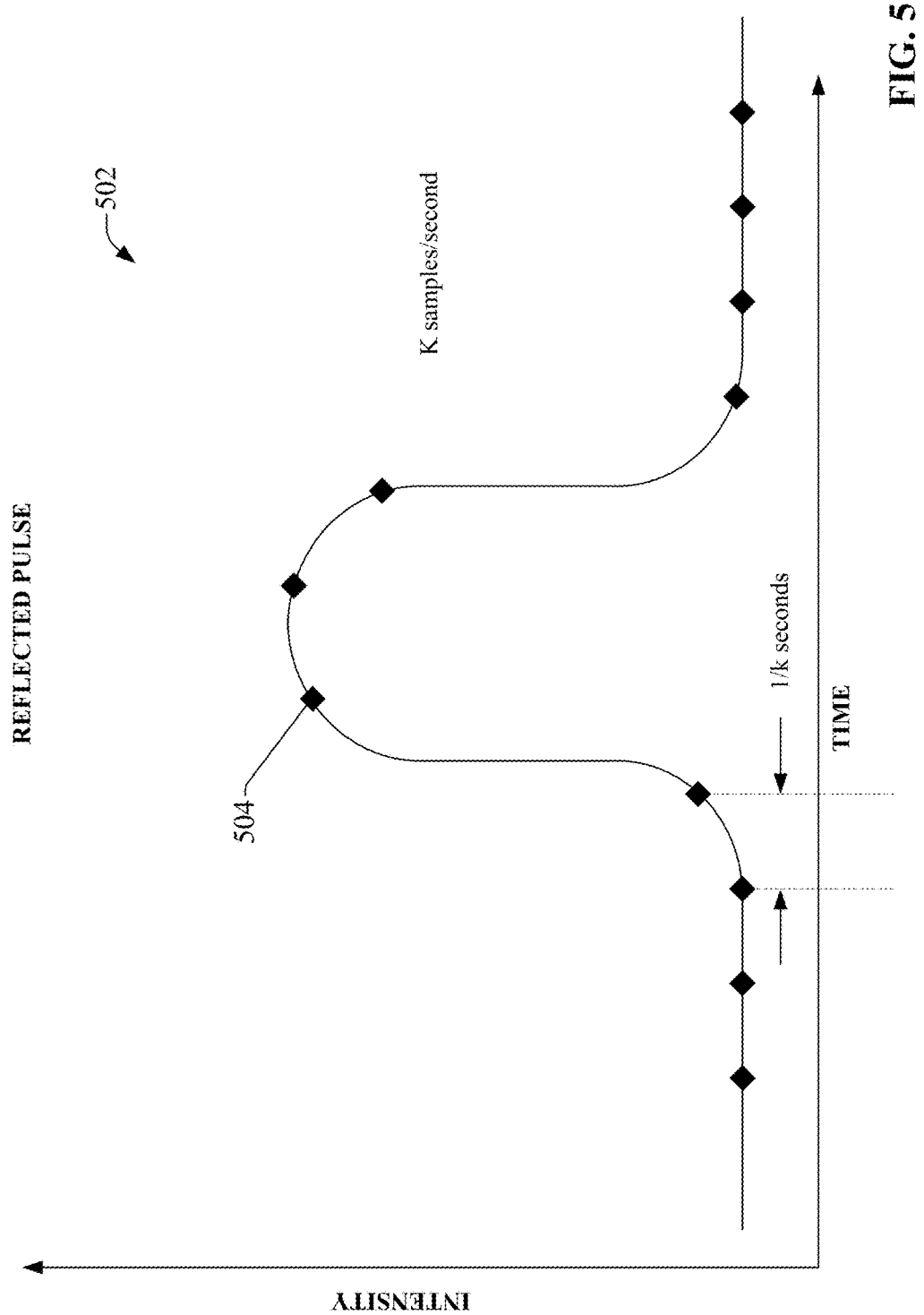
FIG. 5 is a graph illustrating a representation of the reflected light pulse sampled at a high rate of sampling.

FIG. 5 is a graph 502 illustrating a representation of the reflected light pulse 406 sampled at k samples/second (where k is an integer) to yield a number of sampled points 504 spaced apart in time by 1/k seconds. In this example, k samples/second represents a desired sampling rate that ensures accurate reconstitution of the reflected light pulse waveform. Using certain types of photo-receivers, such a sampling rate may not be conductive to achieving accurate signal-to-noise ratio (SNR). One or more embodiments of the TOF sensor device described herein employ waveform reconstruction techniques capable of reconstructing the waveform at the desired sample rate of k samples/second. The TOF sensor achieves this by executing a number of accumulation cycles during which the electrical output of the photo-receivers in response to incident light is read and integrated over controlled exposure times, referred to herein as integration periods, to yield accumulated values.

Figure 6:
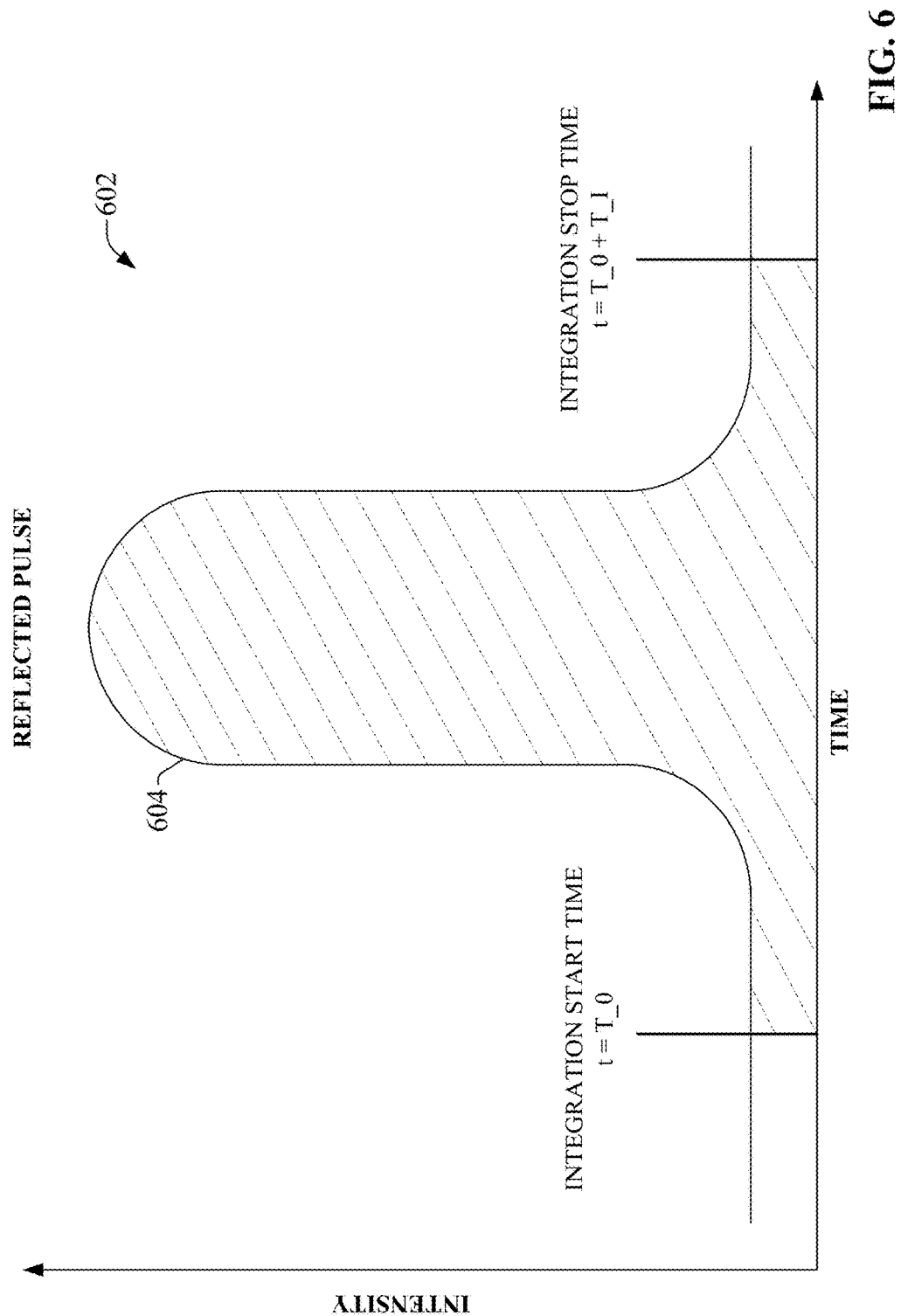
FIG. 6 is a graph plotting a waveform for a reflected pulse, with the area below the curve of the waveform representing the accumulation value over an integration period.

FIG. 6 illustrates a graph 602 of a waveform 604 representing the electrical output of a photo-receiver over time during an example integration period. The electrical output is a function of the intensity of light incident on the surface of the photo-receiver. The integration period begins at $t=T\_0$ and has a duration of $T\_I$ seconds, for a total integration duration of $T\_I$ seconds. In this example, the entirety of a reflected light pulse was received at the photo-receiver during the integration period, such that the peak, rising edge, and falling edge of the waveform 604 fall within the integration period (as will be explained in more detail below, this will not be the case for all accumulation cycles, since the integration window is shifted for each accumulation cycle). The area 606 below the curve of the waveform 604 is marked with dashed lines, and represents the sum of all the electrical output generated by the photo-receiver in response to incident light between $t=T\_0$ and $(T\_0+T\_I)$. By integrating the incident light energy measured over this integration time period, the value of the electrical output obtained from the photo-receiver will be obtained as a sum of all the electrical output generated by the photo-receiver during the integration period.

According to the general methodology utilized by one or more embodiments of the TOF sensor described herein, the waveform reconstruction component 208 executes a number of accumulation cycles. For multiple integration cycles of each accumulation cycle, the electrical output of the photo-receivers in response to incident light is read and integrated over the integration period, and the integration results for the multiple integration cycles are added together to yield accumulated values. For each accumulation cycle, the start time of the integration period is delayed by a delay period relative to the start time of the integration period for the previous accumulation cycle, exposing the photo-receiver to a different portion of the reflected light pulse waveform relative to the previous accumulation cycle. The differences between pairs of consecutive accumulation values are then obtained to yield a set of time-based sampled values for the reflected waveform, which can be used to accurately reconstruct the reflected waveform (e.g. by interpolating between the sampled values).

Figure 7:
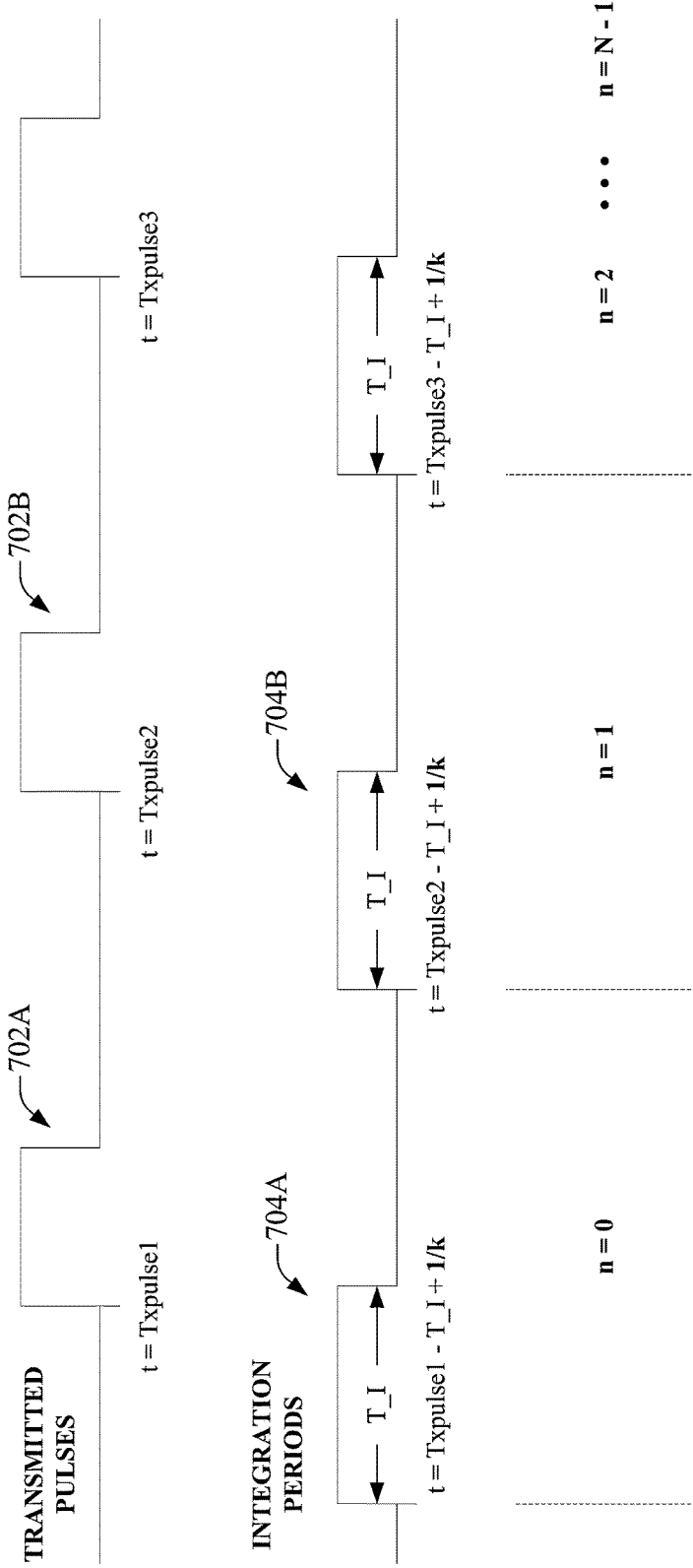
FIG. 7 is a timing chart illustrating relative timings of an emitted pulse, a reflected pulse, and integration periods for a first accumulation.

This technique is now described in more detail. FIG. 7 is a timing diagram for a portion of first accumulation cycle (Accumulation Cycle #1). Per normal operation of the TOF sensor, the illumination component 204 of the TOF sensor emits a train of transmitted light pulses 702 toward a viewing field. The light pulses are transmitted within a rate P (pulses per second). The accumulation cycle comprises N integration cycles or accumulations, with each integration cycle corresponding to one of the transmitted light pulses 702. For a first integration cycle n=0, the waveform reconstruction component 208 initiates a first integration period 704A, where the start time of the integration period is a function of the start time of the first transmitted pulse 702A. For example, if the first transmitted pulse 702A begins at time t=Txpulse1, the first integration period may begin at time t=Txpulse1−T_I+1/k, where T_I is the duration of the integration period and k is a desired sampling resolution (samples per second). As shown in FIG. 7, the waveform reconstruction component 208 initiates each integration period 704 synchronized with the start of the transmitted light pulses 702, ensuring that the relative timing between the transmitted pulse and the integration period remains fixed for each of N integration cycles of the accumulation cycle.

During each integration period 704, the waveform reconstruction component 208 measures the instantaneous electrical output q of the photo-receiver (which is a function of the light incident on the surface of the photo-receiver) and integrates q over the integration period. This process is repeated for N integration cycles (that is, for integration cycles n=0−(N−1)), and the integrated results obtained for N integration cycles are added to yield an accumulation result (Accumulation #1) for Accumulation Cycle #1. This result is represented by equation (1) below:

$$\text{Accumulation \#1} = \sum_0^{N-1} \int_{t=T_0}^{t=T_0+T\_I} q\,dt \qquad (1)$$

where q is the instantaneous electrical output generated by the photo-receiver, N is the number of integration cycles performed for the accumulation cycle, and T0 is the start time for the integration period. Note that integration of the instantaneous electrical output of the photo-receiver is performed from T0 to (T0+T_I), corresponding to the time window defined by the integration period. The start time of each integration period T0 is calculated from the rising edge of the transmitted pulse, and in some instances of the accumulation cycles, the start time of the integration period T0 will be earlier in time than the rising edge of the transmitted light pulse.

Figure 8:
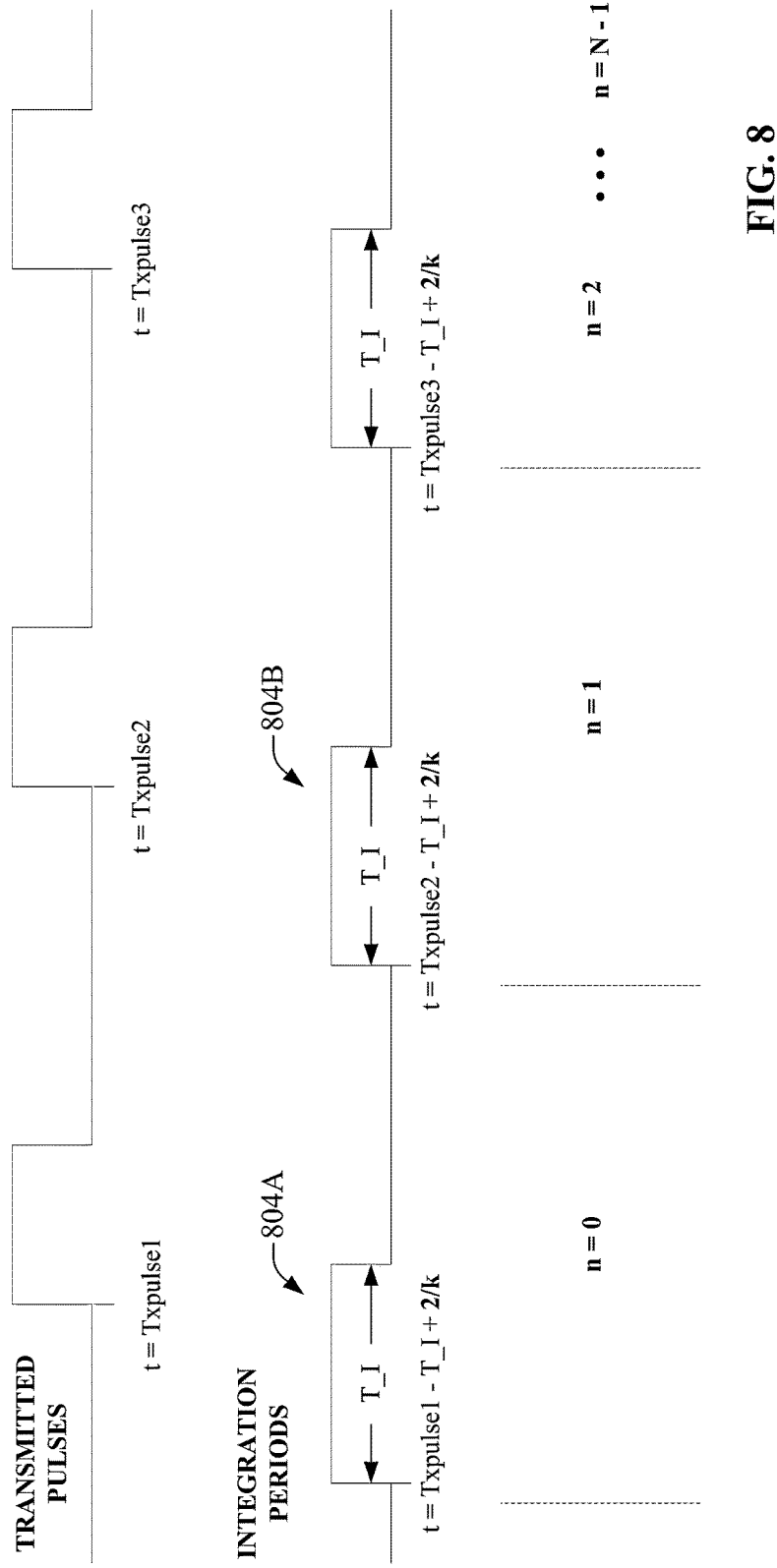
FIG. 8 is a timing chart illustrating relative timings of an emitted pulse, a reflected pulse, and integration periods for a second accumulation.

The waveform reconstruction component 208 then begins a second accumulation cycle (Accumulation Cycle #2). FIG. 8 is a timing diagram illustrating the second accumulation cycle. As in Accumulation Cycle #1, the waveform reconstruction component 208 begins Accumulation Cycle #2 by initiating an integration period 804A lasting T_I seconds for a first integration cycle n, during which the incident light energy exposed to the photo-receiver is integrated. However, for Accumulation Cycle #2, the start time for the integration period 804A is delayed relative to the start time of the integration period 704A for Accumulation Cycle #1 by 1/k seconds (that is, whereas the integration period for the first accumulation cycle was initiated at Txpulse1−T_I+1/k, the integration period for the second accumulation cycle is initiated at Txpulse1−T_I+2/k). The instantaneous electrical output q is integrated over the duration of the delayed integration period to yield an integration value for the first integration cycle (n=0), and this integration is again repeated for N total integration cycles. The integration values obtained for the N integration cycles are summed to yield the total accumulation value for the second accumulation cycle, according to equation (2) below:

$$\text{Accumulation \#2} = \sum_0^{N-1} \int_{t=T_0+1/k}^{t=T_0+\frac{1}{k}+T\_I} q\,dt \qquad (2)$$

For Accumulation #2, per the delayed integration period, integration of the instantaneous electrical output of the photo-receiver is performed from T0+1/k to (T0+1/k+T_I). Repeating the integration for N integration cycles (n=0−(N−1)) yields the total accumulated value for Accumulation Cycle #2.

Once these two accumulation values have been obtained, the waveform reconstruction component 208 can calculate a value of the first sample point of the waveform by subtracting the accumulated value of the Accumulation Cycle #2 (Accumulation #2) from the accumulated value of Accumulation Cycle #1 (Accumulation #1). This difference value represents the first sampled value of the waveform for the reflected pulse between time Txpulse and Txpulse+1/k.

Figure 9:
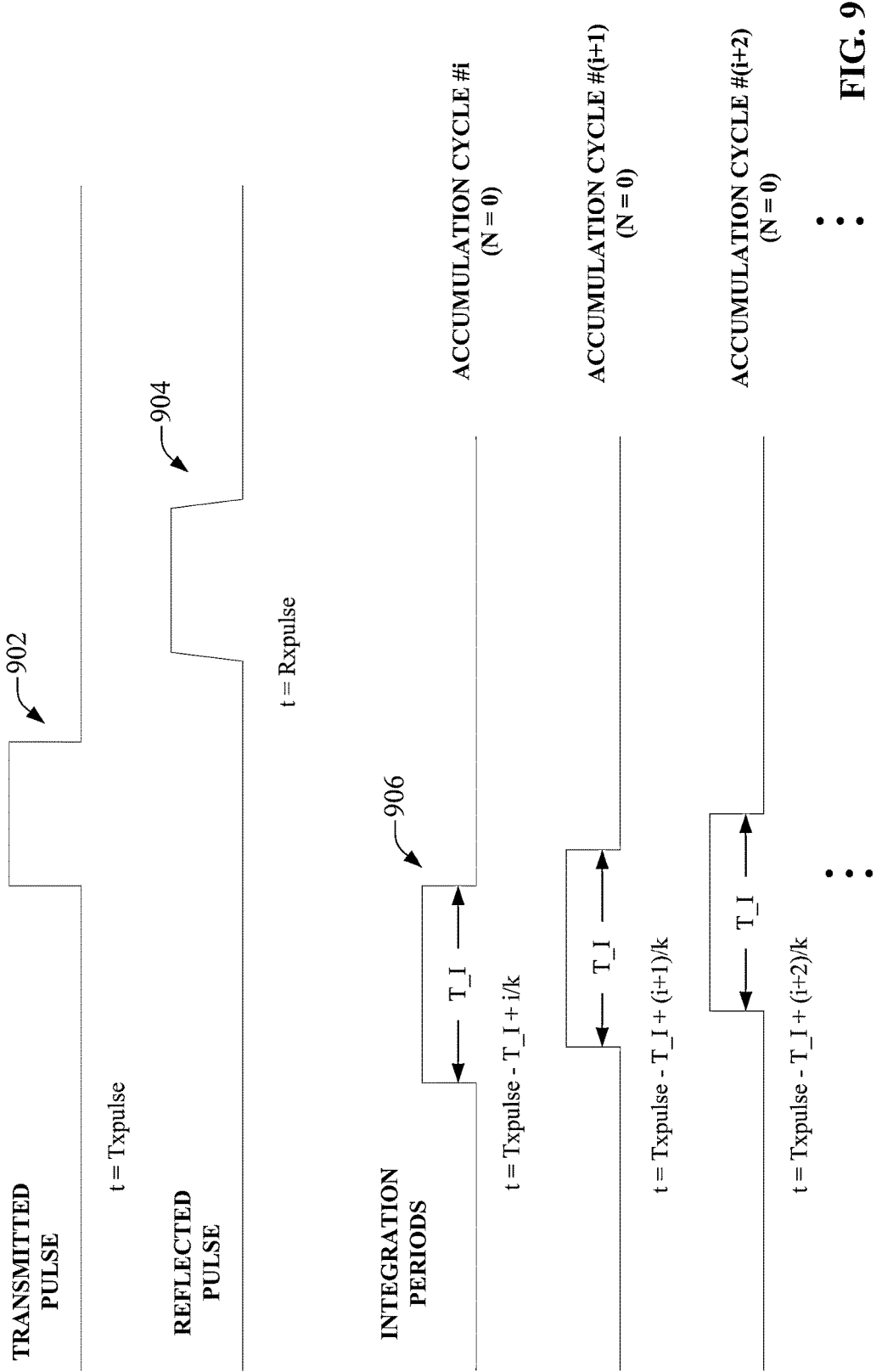
FIG. 9 is a timing diagram illustrating integration periods for multiple consecutive accumulation cycles relative to a transmitted light pulse and a reflected light pulse.

Waveform reconstruction component 208 repeats this sequence by executing additional accumulation cycles, with the start time of each integration period delayed by 1/k relative to the previous cycle. FIG. 9 is a timing diagram illustrating integration periods for multiple consecutive accumulation cycles relative to the transmitted light pulse 902 and reflected light pulse 904. In this example, only the integration periods 906 for the first integration cycle (n=0) of each accumulation cycle are shown. As shown in FIG. 9, an integration period for an ith accumulation cycle is delayed relative to integration period of the (i−1)th accumulation cycle by i/k seconds. Since the time t=Rxpulse of the rising edge of a reflected light pulse 904 seen by the photo-receptor in response to emission of transmitted light pulse 902 will remain relatively constant relative to time t=Txpulse of the rising edge of the transmitted light pulse 902 over the course of the accumulation cycles (as a function of the distance of an object in front of the TOF sensor), the shifting integration periods of each successive accumulation cycle causes an incrementally increasing portion of the reflected light pulse 904 to be included in the integration. Consequently, the difference between the accumulated electrical output of two consecutive accumulated values (I and I+1)—which is a function of the differential value between two corresponding points on the waveform representing the reflected light pulse—can be taken as the ith sampled value of the waveform between time Txpulse+i/k and Txpulse+(i+1)/k. Accordingly, the waveform reconstruction component 208 can perform N accumulation cycles, and obtain successive sampled values for the reflected waveform by subtracting the accumulation value of each accumulation cycle from the accumulation value of the immediately preceding cycle. That is, a given ith sample point is obtained using equation (3) below:

Sample Point #$i$=Accumulation #($i$)−Accumulation #($i$+1)  (3)

Waveform reconstruction component 208 can reconstruct the entire waveform corresponding to the reflected light pulse 904 by repeating the above T_I/k times. With a sufficient number of sampled values obtained using equations (1)-(3), a plot similar to that depicted in FIG. 5 can be obtained, and the waveform for the reflected light pulse can be accurately reconstituted; e.g., by applying curve-fitting techniques to the sampled values.

Figure 10:
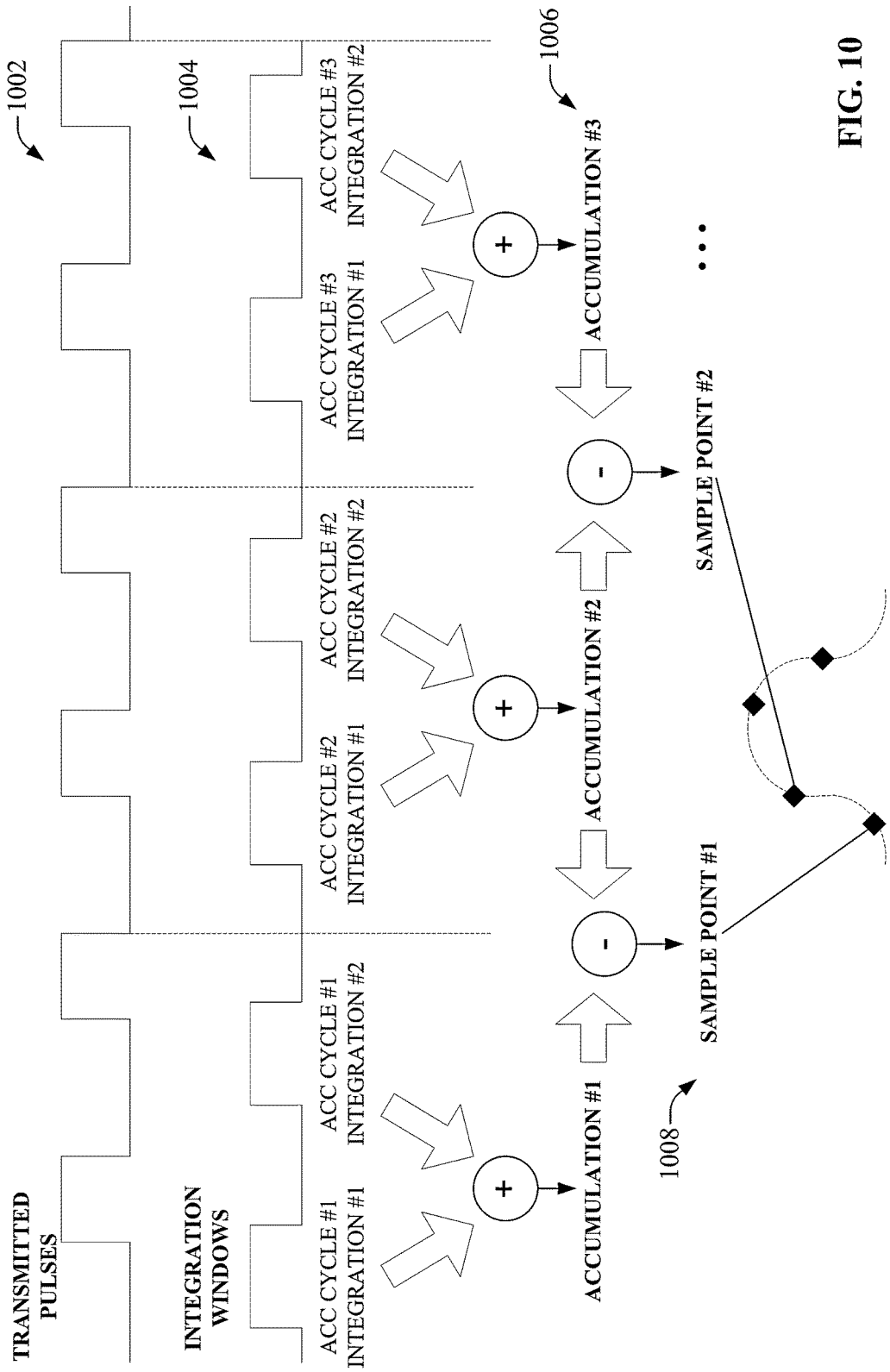
FIG. 10 is a diagram illustrating the derivation of sample points for a reflected light pulse waveform.

FIG. 10 is a diagram illustrating the derivation of sample points for a reflected light pulse waveform using the techniques described above. For simplicity, FIG. 10 only depicts three accumulation cycles, with only two integration cycles per cycle. Also, the reflected light pulses corresponding to each transmitted pulse is not shown in FIG. 10. As in previous examples, TOF sensor emits transmitted pulse 1002 within a period P. For a first accumulation cycle, the instantaneous electrical output q of the photo-receiver is integrated over respective two integration periods, and the results are added to yield Accumulation #1. For the second accumulation cycle, the integration period is delayed by 1/k relative to the integration period of the first accumulation cycle, and the process is repeated using the delayed integration period to yield Accumulation #2. For the third accumulation cycle, the integration period is delayed by 1/k relative to the integration period of the second accumulation cycle, and the process is repeated to yield Accumulation #3. The difference between Accumulation #1 and Accumulation #2 yields sample point #1, and the difference between Accumulation #2 and Accumulation #2 yields sample point #2. Repeating this for additional accumulation cycles yields a set of sample points at intervals 1/k seconds for a waveform corresponding to a received light pulse reflected in response to emission of the transmitted light pulse.

Some embodiments of the TOF sensor device 202 can also include background light compensation features to improve SNR. To this end, the waveform reconstruction component 208 may be configured to begin the accumulation period before the emitted light pulse is sent. For example, the start time T_0 of the accumulation cycle may be set to begin at T_I−1/k seconds before the rising edge of the emitted light pulse. By starting the accumulation at T_I−1/k, the waveform reconstruction component 208 can measure the background light present in the accumulation during the period before the light pulse is sent, and use this information to improve the SNR.

In some embodiments, one or more parameters of the TOF sensor device 202 can be configured as needed to suit the needs of a particular application. For example, the total integration time T_I determines the range for which objects within the viewing field will be detected. Accordingly, one or more embodiments of the TOF sensor device 202 allow the user to adjust this integration time as needed to optimize the operating range for the as required by the monitoring application.

Also, in some embodiments, the delay between accumulation cycles (that is, the delay between the completion of accumulation cycle #i and accumulation cycle #i+1) can be made variable. In this regard, the delay between accumulation cycles can be set automatically by the waveform reconstruction component 208, e.g., as a function of object distance or range or as a function of the signal to noise ratio. For example, the waveform reconstruction component 208 may set the delay between accumulation cycles to be shorter in direct proportion to the closeness of an object to the TOF sensor device. Since a shorter delay between accumulation cycles results in finer distance resolution, distance resolution is made finer the closer the object is to the TOF sensor, and resolution is decreased for objects that are farther away. Thus, resolution of the time delay—and consequently the resolution of the distance—is automatically controlled as a function of range. In this way, the waveform reconstruction component 208 is able to substantially optimize the trade-off between object distance and resolution.

Figure 11A:
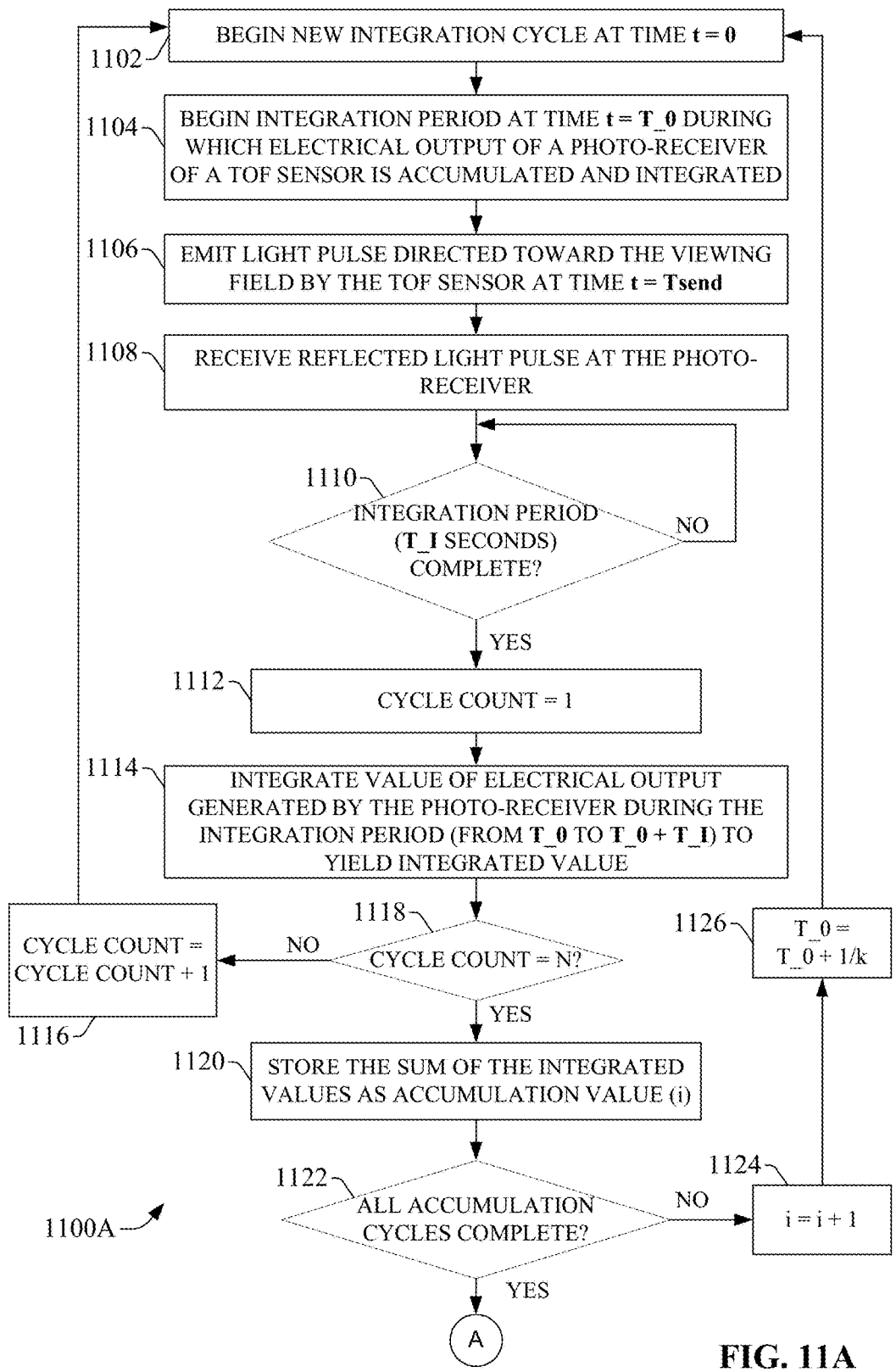
FIG. 11A is a first part of a flowchart of an example methodology for reconstructing a waveform corresponding to a reflected light pulse incident on a photo-receiver of a TOF sensor device.
Figure 11B:
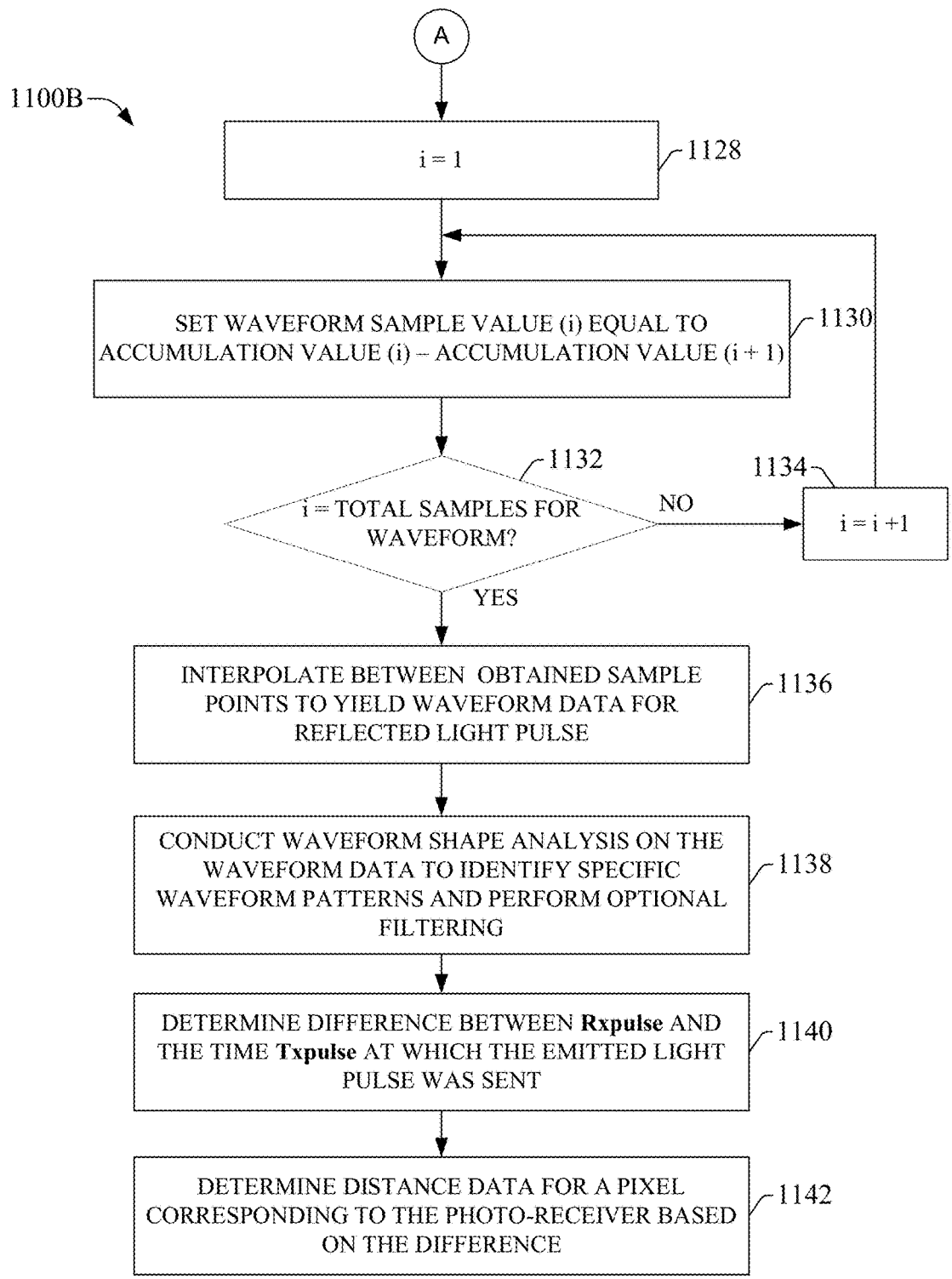
FIG. 11B is a second part of the flowchart of the example methodology for reconstructing a waveform corresponding to a reflected light pulse incident on a photo-receiver of a TOF sensor device.

FIGS. 11A-11B illustrate a methodology in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 11A illustrates a first part of an example methodology 1100A for reconstructing a waveform corresponding to a reflected light pulse incident on a photo-receiver of a TOF sensor device. Initially, at 1102, a new integration cycle begins at time t=0. At 1104, an integration period begins at time t=T_0. During the integration period, which lasts T_I seconds, electrical output of a photo-receiver of a TOF sensor is accumulated and integrated. At 1106, a light pulse is emitted toward the viewing field by the TOF sensor at time t=Tsend. At 1108, a reflected light is received at the photo-receiver.

At 1110, a decision is made regarding whether the integration period has completed. The integration period completes when time t=T_0=T_I. If the integration period has not completed, the methodology loops until the integration period has completed. When the integration period has completed, the methodology moves to step 1112, where an integration cycle count is set to 1. At 1114, the value of the electrical output generated by the photo-receiver during the integration period (that is, from time T_0 to (T_0+T_I)) is integrated to yield an integrated value. At 1118, a determination is made regarding whether the integration cycle count is equal to a total number of integration cycles N to be performed. If the integration cycle count is not equal to N, the methodology moves to 1116, where the cycle count is incremented. The methodology then returns to step 1102, and steps 1102-1118 are repeated for a next integration cycle, resulting in another integrated value generate at step 1114. This sequence is repeated for N integration cycles.

When it is determined at step 1118 that all N integration cycles for the current accumulation cycle have completed, the methodology moves to step 1120, where the sum of the accumulated values determined at step 1114 for all N cycles is stored as accumulated value i. This value is represented by equation (1) above. At 1122, a determination is made regarding whether all accumulation cycles have completed. In some embodiments, the number of accumulation cycles to be run is equal to T_I/k, where k is a desired sampling frequency for the waveform (in samples/second). If it is determined at step 1122 that additional accumulation cycles are to be run, the methodology moves to step 1124, where accumulation cycle pointer i is incremented (representing the next accumulation cycle), and at 1126 a delay of 1/k seconds is added to the time T_0 at which the integration period for the next cycle is to begin. The methodology then returns to step 1102, where a new integration cycle begins and steps 1102-1120 are carried out for the subsequent cycle using the delayed value of T_0 to determine the start and stop time for the integration period within the cycle. Steps 1102-1120 are repeated until all accumulation cycles have completed (e.g., T_I/k accumulation cycles), resulting in a set of accumulated values respectively corresponding to the accumulation cycles.

When it is determined at step 1122 that all accumulation cycles have completed, the second part of the example methodology 1100B is performed, as illustrated in FIG. 11B. At 1128, accumulation cycle pointer i is set to 1. At 1130, waveform sample value (i) is set equal to the accumulation value (i) minus accumulation value (i+1). That is, a given waveform sample value is calculated by determining the difference between accumulation values obtained at step 1120 for two consecutive accumulation cycles, as represented by equation (3) above.

At 1132, a determination is made regarding whether i is equal to the total samples to be obtained for the waveform. If all samples have not been obtained, the pointer i is incremented at step 1134 and the methodology returns to step 1130 to determine the next waveform sample value. When it is determined at step 1132 that all samples have been obtained, the methodology moves to step 1136, where waveform data for the reflected light pulse incident on the photo-receiver is obtained by interpolating between the sampled points (e.g., using curve-fitting techniques). At 1138, waveform shape analysis is performed on the waveform data to identify specific waveform patterns. Additionally, filtering of the waveform may be performed based on a result of the waveform shape analysis. For example, if it is determined that the waveform data corresponds to a waveform pattern that is not relevant for construction of depth map data, the waveform data may be filtered or ignored. At 1140, the difference between Rxpulse (the time of arrival of the reflected waveform) and Txpulse (the time at which the emitted light pulse was sent) is determined based on the waveform data. At 1142, distance data for a pixel corresponding to the photo-receiver is determined based on the difference determined at step 1140.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, Ethernet/IP, safety networks (e.g., CIP safety), etc. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 12:
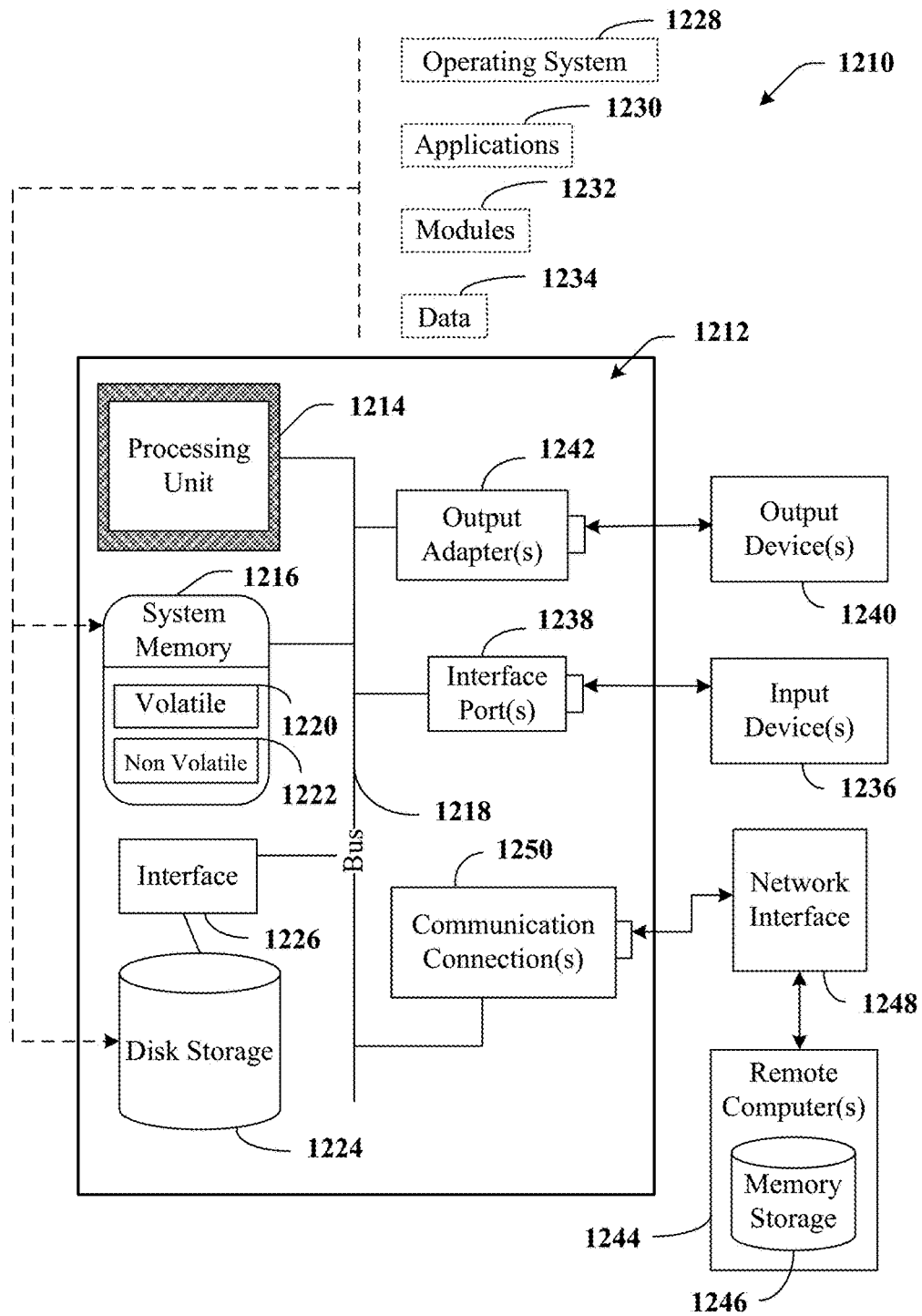
FIG. 12 is an example computing environment.
Figure 13:
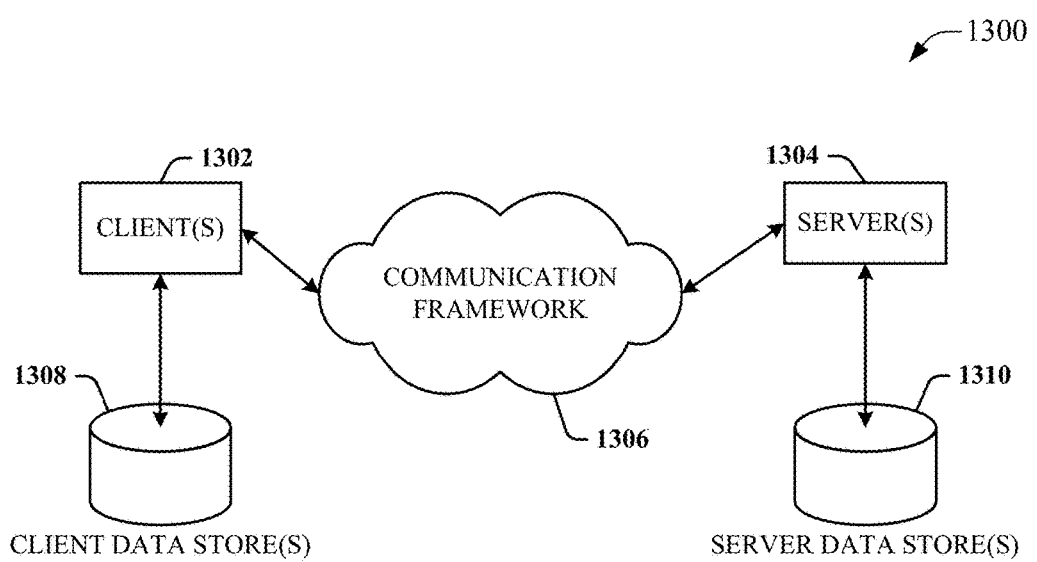
FIG. 13 is an example networking environment.

In order to provide a context for the various aspects of the disclosed subject matter, FIGS. 12 and 13 as well as the following discussion are intended to provide a brief, general description of a suitable environment in which the various aspects of the disclosed subject matter may be implemented.

With reference to FIG. 12, an example environment 1210 for implementing various aspects of the aforementioned subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Multi-core microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable PROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/nonvolatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1224 to the system bus 1218, a removable or non-removable interface is typically used such as interface 1526.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer 1212. System applications 1230 take advantage of the management of resources by operating system 1228 through program modules 1232 and program data 1234 stored either in system memory 1216 or on disk storage 1224. It is to be appreciated that one or more embodiments of the subject disclosure can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapters 1242 are provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1546 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the system bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

FIG. 13 is a schematic block diagram of a sample computing environment 1300 with which the disclosed subject matter can interact. The sample computing environment 1300 includes one or more client(s) 1302. The client(s) 1302 can be hardware and/or software (e.g., threads, processes, computing devices). The sample computing environment 1300 also includes one or more server(s) 1304. The server(s) 1304 can also be hardware and/or software (e.g., threads, processes, computing devices). The servers 1304 can house threads to perform transformations by employing one or more embodiments as described herein, for example. One possible communication between a client 1302 and servers 1304 can be in the form of a data packet adapted to be transmitted between two or more computer processes. The sample computing environment 1300 includes a communication framework 1306 that can be employed to facilitate communications between the client(s) 1302 and the server(s) 1304. The client(s) 1302 are operably connected to one or more client data store(s) 1308 that can be employed to store information local to the client(s) 1302. Similarly, the server(s) 1304 are operably connected to one or more server data store(s) 1310 that can be employed to store information local to the servers 1304.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A time-of-flight (TOF) sensor device, comprising:
a memory that stores computer-executable components;
a processor, operatively coupled to the memory, that executes the computer-executable components, the computer-executable components comprising:
an illumination component configured to emit a light pulse toward a viewing field;
a photo-receiver configured to generate an electrical output proportional to an intensity of light incident on a surface of the photo-receiver;
a pixel array component configured to measure the electrical output; and
a waveform reconstruction component configured to generate sampled values of a waveform corresponding to a reflected light pulse received by the photo-receiver, wherein the waveform reconstruction component generates a sampled value, of the sampled values, based on a difference between a first accumulated value obtained during a first accumulation cycle and a second accumulated value obtained during a second accumulation cycle, wherein
the first accumulated value comprises a first sum of N integrated values of the electrical output integrated over respective N first integration periods during the first accumulation cycle, where N is an integer,
the second accumulated value comprises a second sum of N integrated values of the electrical output integrated over respective N second integration periods during the second accumulation cycle, the second integration periods have same durations as the first integration periods, and
a start time of the second integration periods within the second accumulation cycle is delayed by a delay period relative to a start time of the first integration periods within the first accumulation cycle.

2. The TOF sensor device of claim 1, wherein the delay period is equal to 1/k seconds, where k is a specified number of samples per second to be generated for the waveform.

3. The TOF sensor device of claim 1, wherein the waveform reconstruction component is configured to, for respective accumulation cycles of the first accumulation cycle and the second accumulation cycle:
determine a first integral of an instantaneous electrical output of the photo-receiver between a start time of an integration period and an end time of the integration period,
determine the first integral for N integration cycles to yield N first integrals; and
sum the N first integrals to yield an accumulated value.

4. The TOF sensor device of claim 1, wherein the waveform reconstruction component is further configured to generate the waveform corresponding to the reflected light pulse based on the sampled values.

5. The TOF sensor device of claim 4, wherein the waveform reconstruction component is configured to generate the waveform based on interpolation between the sampled values.

6. The TOF sensor device of claim 4, further comprising a distance determination component configured to determine a duration between a first time corresponding to a rising edge of the waveform and a second time at which the light pulse was emitted, and to generate distance information for a pixel corresponding to the photo-receiver based on the duration.

7. The TOF sensor device of claim 6, wherein the waveform reconstruction component is further configured to set the delay period based on at least one of the distance information or a measured signal-to-noise ratio.

8. The TOF sensor device of claim 4, further comprising a waveform analysis component configured to perform pattern recognition analysis on the waveform to yield a pattern recognition result and to filter the reflected light pulse in response to a determination that the pattern recognition result satisfies a criterion.

9. The TOF sensor device of claim 1, wherein the waveform reconstruction component is further configured to generate a number of accumulation values, including the first accumulation value and the second accumulation value, for respective accumulation cycles for a given waveform, wherein the number of accumulation values is based on a specified number of sampled values to be generated for the waveform.

10. The TOF sensor device of claim 1, wherein the waveform reconstruction component is further configured to measure, as a background light indication, a portion of the electrical output between the start time of a first integration period, of the N first integration periods, and a time at which the illumination component emits the light pulse, and to modify at least one of the first accumulated value or the second accumulated value based on the portion of the electrical output.

11. A method for reconstituting a waveform for a time-of-flight (TOF) light pulse, comprising:
for respective N first integration cycles a first accumulation cycle:
initiating, by a TOF sensor device comprising at least one processor, a first integration period for a first integration cycle;
emitting, by the TOF sensor device, a first light pulse during the first integration cycle;
integrating an instantaneous electrical output generated by a photo-receiver of the TOF sensor device over a duration of the first integration period to yield a first integral value; and
adding the first integral value to other integral values obtained for remaining (N−1) first integration cycles of the N first integration cycles to yield a first accumulation value;
for respective N second integration cycles of a second accumulation cycle:
initiating a second integration period having a same duration as the first integration period for a second integration cycle, wherein the initiating comprises delaying a start time of second integration period within the second integration cycle by a delay period relative to a start time of the first integration period within the first integration cycle;

emitting, by the TOF sensor device, a second light pulse during the second integration cycle;

integrating an instantaneous electrical output generated by the photo-receiver over a duration of the second integration period to yield a second integral value; and adding the second integral value to integral values obtained for remaining (N−1) second integration cycles of the N second integration cycles to yield a second accumulation value; and determining a difference between the first accumulated value and the second accumulated value to yield a sampled value for a waveform corresponding to a reflected light pulse received at the photo-receiver.

12. The method of claim 11, wherein the delay period is equal to or substantially equal to 1/k seconds, where k is a specified sampling frequency for sampling the waveform.

13. The method of claim 11, further comprising:

generating a number of accumulated values, including the first accumulated value and the second accumulated value, for respective integration periods, wherein the number of accumulated values is based on a specified number of sampled values to be generated for the waveform, and wherein an ith integration period of the integration periods is delayed by the delay period relative to an (i−1)th integration period of the integration periods; and determining differences between consecutive accumulation values of the accumulation values to yield a set of sampled values for the waveform.

14. The method of claim 13, further comprising generating waveform data representing the waveform based on interpolation between the sampled values.

15. The method of claim 11, further comprising setting a value of the delay period based on at least one of a measured distance of an object from the TOF sensor device or a measured signal-to-noise ratio.

16. The method of claim 11, further comprising:

measuring an amount of electrical output generated by the photo-receiver during a time period between initiation of the first integration period and the emitting of the first light pulse; and modifying the sampled value based on the amount of electrical output.

17. A non-transitory computer-readable medium having stored thereon instructions that, in response to execution, cause a time-of-flight (TOF) sensor device comprising a processor to perform operations, the operations comprising:

for an accumulation cycle of a plurality of accumulation cycles:

initiating an integration period having a fixed duration for the accumulation cycle, wherein a start time of the integration period within the accumulation cycle is delayed by a delay period relative to a start time of the integration period for a previous accumulation cycle of the plurality of accumulation cycles;

emitting a light pulse;

integrating, for N iterations of the initiating and the emitting, an instantaneous electrical output generated by the photo-receiver over a duration of the integration period to yield N integral values; and summing the N integral values to yield an accumulated value;

repeating the initiating, the emitting, the integrating, and the summing for the plurality of accumulation cycles to yield a respective plurality of accumulated values; and determining difference values between consecutive accumulated values of the accumulated values to yield a set of sampled values for a waveform corresponding to the reflected light pulse.

18. The non-transitory computer-readable medium of claim 17, wherein the operations further comprise generating waveform data representing the waveform based on interpolation between the sampled values.

19. The non-transitory computer-readable medium of claim 18, wherein the operations further comprise:

determining a first time corresponding to a rising edge of the waveform based on the waveform data;

determining a difference between the first time and a second time at which the light pulse is emitted; and determining a distance value for a pixel corresponding to the photo-receiver based on the difference.

20. The non-transitory computer-readable medium of claim 19, wherein the operations further comprise setting a value of the delay period based on the distance value.

* * * * *